United States Patent [19]

Kuze

[11] Patent Number: 5,152,540
[45] Date of Patent: Oct. 6, 1992

[54] TUBULAR MEMBER DEFORMABLE INTO A BELLOWS FOR SEALING A RECIPROCATING ROD

[76] Inventor: Yoshikazu Kuze, 31-3 Higashimagome 1-chome, Ohta-ku, Tokyo, Japan

[21] Appl. No.: 608,380

[22] Filed: Nov. 2, 1990

[30] Foreign Application Priority Data

Nov. 4, 1989 [JP] Japan .................................. 1-286031
Dec. 11, 1989 [JP] Japan .................................. 1-318789

[51] Int. Cl.$^5$ ...................... F16J 15/32; H01H 13/06
[52] U.S. Cl. .............................. 277/208; 277/212 R; 277/212 FB; 403/50; 74/18.2; 200/302.2; 200/302.3
[58] Field of Search ............... 277/208, 212 R, 212 F, 277/212 C, 212 FB; 403/50, 51; 74/18.1, 18.2; 200/302.1, 302.2, 302.3

[56] References Cited

U.S. PATENT DOCUMENTS

| | | | |
|---|---|---|---|
| 1,980,508 | 11/1934 | Tefft | 74/18.2 X |
| 2,170,574 | 8/1939 | Sauzedde | 74/18.2 X |
| 2,172,079 | 9/1939 | Boehm | 74/18.2 X |
| 2,503,459 | 4/1950 | Thornberry | 74/18.2 X |
| 2,795,144 | 6/1957 | Morse | 74/18.1 X |
| 2,832,223 | 4/1958 | Couraud | 403/50 X |
| 2,901,913 | 9/1959 | Lovegrove | 74/18.1 |
| 3,471,156 | 10/1969 | Burns et al. | 277/208 |
| 3,581,081 | 5/1971 | Rieth | 277/212 X |
| 3,601,420 | 9/1962 | Binford | 277/212 C |
| 3,669,459 | 6/1972 | Bass | 277/212 F X |
| 3,874,826 | 4/1975 | Lundquist et al. | 74/18.2 X |
| 4,276,786 | 7/1981 | Langenstein | 277/212 FB X |
| 4,278,262 | 7/1981 | Mizutani et al. | 277/212 FB |
| 4,298,778 | 11/1981 | Beresford-Jones | 200/302.2 |
| 4,458,907 | 7/1984 | Hoffman, Jr. et al. | 277/208 X |
| 4,702,483 | 10/1987 | Ukai et al. | 403/51 X |
| 4,730,834 | 3/1988 | Ukai et al. | 403/50 X |
| 4,766,272 | 8/1988 | Guzzon | 200/302.2 |
| 4,834,037 | 5/1989 | Lafever | 277/212 C X |
| 4,878,389 | 11/1989 | Boge | 277/212 FB X |
| 4,923,432 | 5/1990 | Porter | 277/212 FB X |

FOREIGN PATENT DOCUMENTS

0124178  8/1931  Austria ........................ 200/302.2
0334436  1/1959  Switzerland ................. 200/302.2

*Primary Examiner*—Allan N. Shoap
*Assistant Examiner*—James K. Folker

[57] ABSTRACT

A tubular member comprises a tubular body made of rubber. The tubular body has a base portion, a head portion, and a plurality of annular grooves or annular projections formed in an inner wall of the body. The base portion is arranged to be secured to a guide member of an actuator, and the head portion is arranged to be engaged with a rod slidably supported in the guide member.

7 Claims, 6 Drawing Sheets

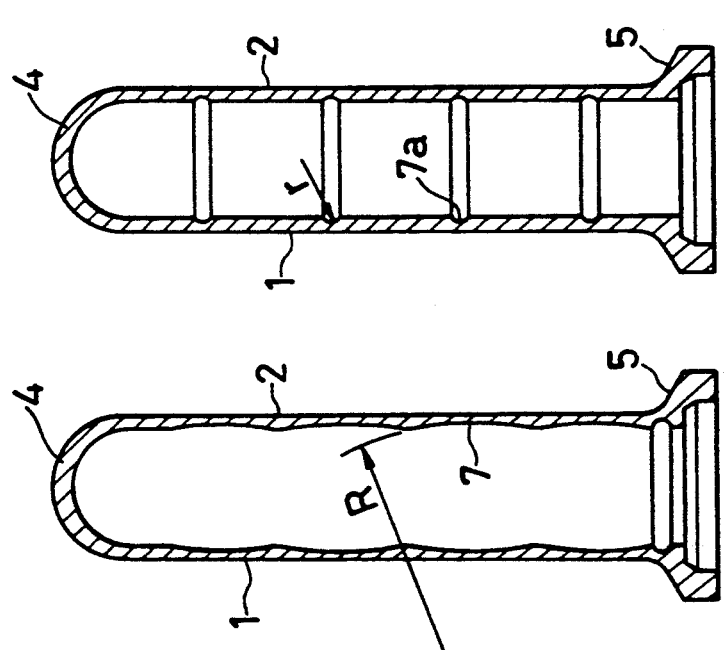

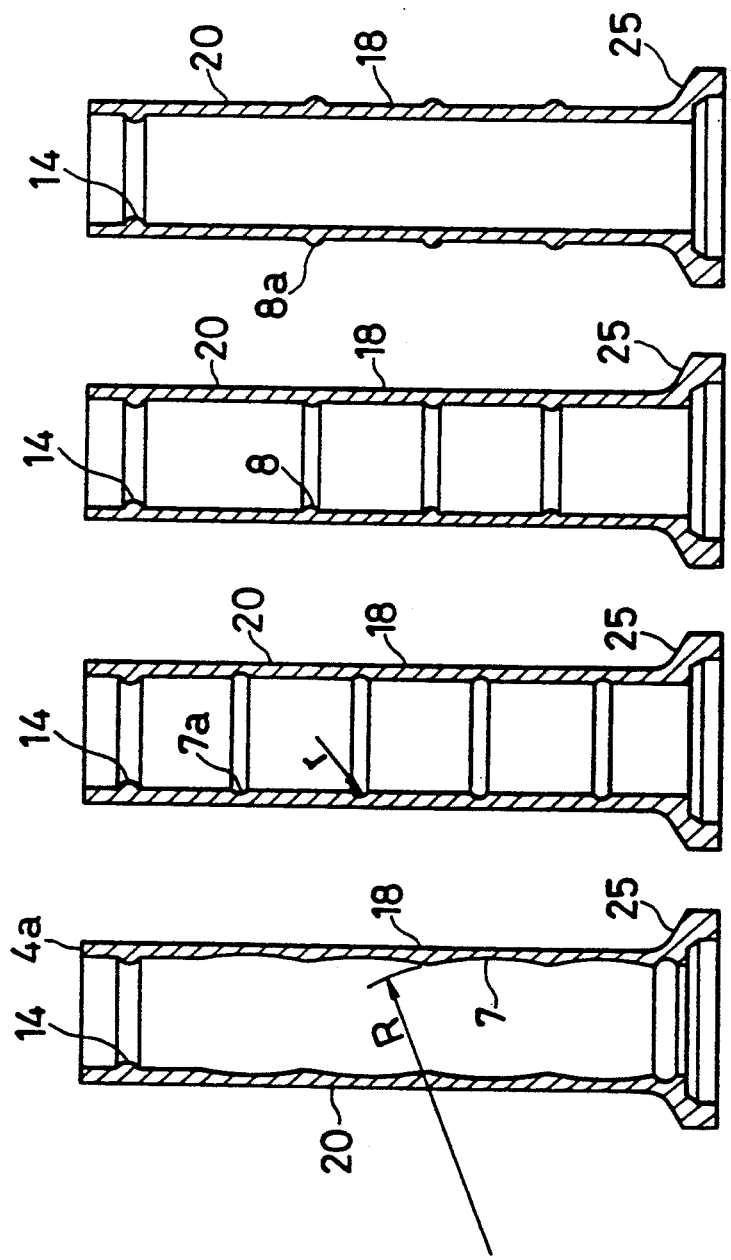

FIG.12
FIG.13
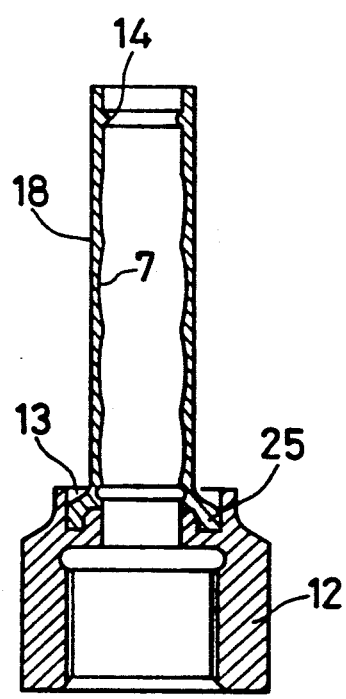
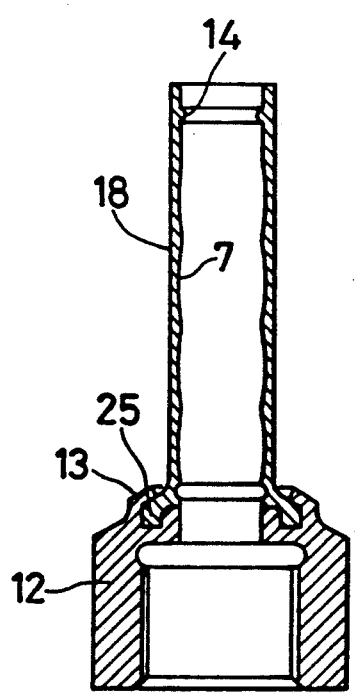

TUBULAR MEMBER DEFORMABLE INTO A BELLOWS FOR SEALING A RECIPROCATING ROD

CROSS-REFERENCE TO RELATED APPLICATION

This invention is disclosed in part in my co-pending application entitled Sealing Means For a Thermostat, Ser. No. 07/608,379, filed on Nov. 2, 1990.

BACKGROUND OF THE INVENTION

The present invention relates to a tubular member for sealing a reciprocating rod such as an actuating rod of an actuator, and more particularly to a tubular member which can be automatically deformed in the form of a bellows when the tubular member is contracted by the actuating rod.

Heretofore, a bellows as a dynamic seal is known. The bellows is made by molding plastic into a shape of a bellows. However, the bellows has not a high sealing effect because of the plastic.

SUMMARY OF THE INVENTION

An object of the present invention is to provide a sealing member made of rubber having a high sealing effect.

Another object of the present invention is to provide a sealing member which may be easily manufactured at a low cost. A further object of the present invention is to provide a tubular member having a long stroke with a small size.

According to the present invention, there is provided a tubular member made of rubber for sealing a reciprocating rod comprising a tubular body having a base portion, a head portion, and a plurality of annular portions, the thickness of each annular portion being different from that of the tubular body, the base portion being arranged to be secured to a guide member of an actuator, the head portion being arranged to be engaged with a rod slidably supported in the guide member.

In an aspect of the invention, each of the annular portions is an annular groove formed in an inner wall of the tubular body. The thin portions of the annular grooves are expanded to automatically form a bellows when the tubular member si contracted.

In another aspect of the invention, each of the annular portions is an annular projecting rib formed on an inner wall or on an outer periphery of the tubular body. A central portion between adjoining annular projecting ribs is expanded to automatically form a bellows when the tubular member is contracted.

Since the tubular member can be contracted from a cylindrical form to a bellows in which adjacent corrugations are contacted with each other, a large stroke can be obtained with a member having a short length.

In addition, since the tubular member is made into a straight tubular form, a very small tubular member can be easily manufactured by molding at low cost.

These and other objects and features of the present invention will become more apparent from the following description with reference to the accompanying drawings.

BRIEF DESCRIPTION OF THE DRAWINGS

FIGS. 1 to 4 are sectional views showing tubular sealing members of various types according to the present invention;

FIGS. 7 to 10 are sectional views showing tubular sealing members as a second embodiment;

FIGS. 12 and 13 are sectional views showing the sealing member mounted on a threaded cap.

DETAILED DESCRIPTION OF THE PREFERRED EMBODIMENTS

Figure 5:
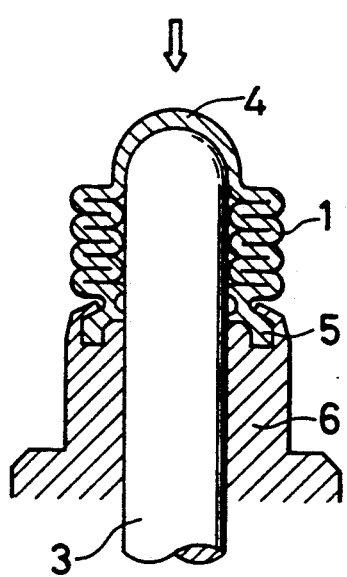
FIG. 5 is a sectional view of the sealing member of FIG. 1 which is mounted on an actuator.

Referring to FIGS. 1 to 4 showing various types of tubular sealing members 1 made of rubber according to the present invention, each of the tubular sealing members 1 is adapted to automatically form a bellows when compressed.

The tubular sealing member 1 comprises a tubular body 2 as shown in FIG. 1. The tubular body 2 has a base portion 5, a head portion 4 having a closed head, and a plurality of annular grooves 7 circumferentially formed in an inner wall thereof. The annular groove 7 is formed to have a curvature in section having a large radius R.

The tubular sealing member 1 shown in FIG. 2 has a plurality of inner annular grooves 7a each of which has a sectional curvature having a small radius r.

The tubular sealing member 1 shown in FIG. 3 has a plurality of annular projecting ribs 8 circumferentially formed on the inner wall of the tubular body 2.

The tubular sealing member 1 shown in FIG. 4 has a plurality of annular projecting ribs 8a formed on the outer periphery of the tubular body 2.

Referring to FIG. 5, the tubular body 2 of the sealing member 1 is slidably mounted on a piston rod 3 of an actuator (not shown). The length of the sealing member 1 is determined in accordance with to the axial stroke of the piston rod 3. The closed head of the head portion 4 of the sealing member 1 is engaged with or fixed to the top end of the piston rod 3 and the base portion 5 having a skirt portion thereof is secured to a guide member 6 in which the piston rod 3 is slidably mounted. When the head portion 4 is pressed down, the piston rod 3 is downwardly moved and the sealing member 1 is automatically shaped into a bellows as shown in FIG. 5.

Figure 6:
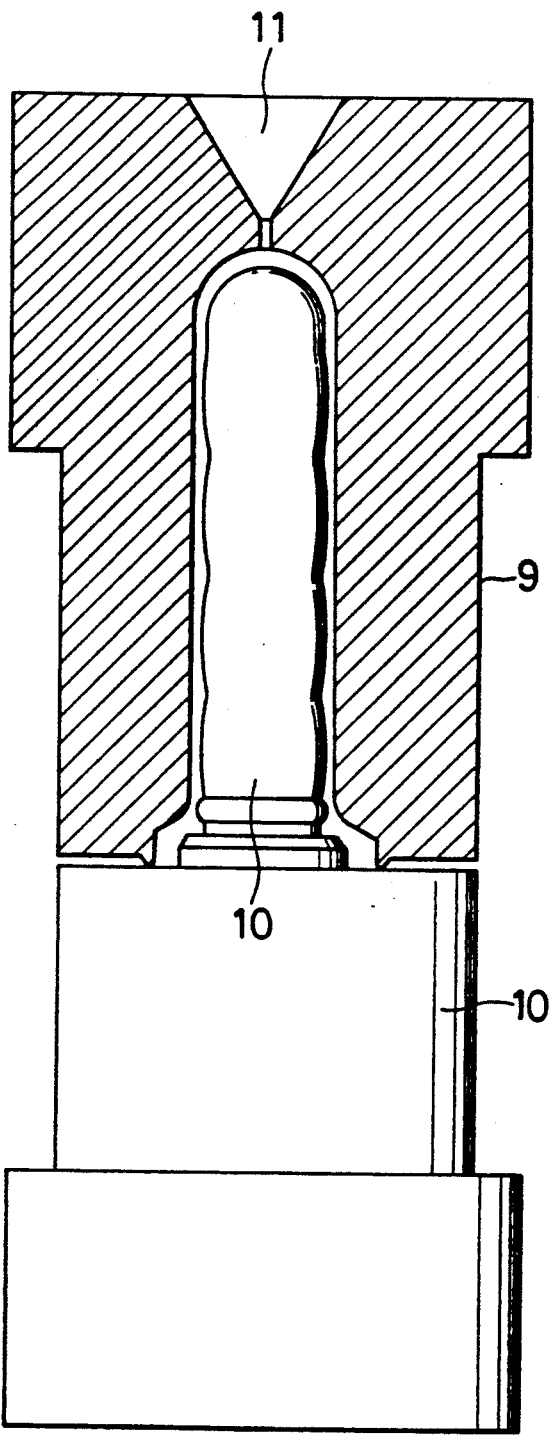
FIG. 6 is a sectional view of a metal molding unit for the sealing member.

FIG. 6 shows a metal mold unit for molding the sealing member 1. A female mold 9 is mounted on a male mold 10, thereby forming a cavity there-between. Melted rubber is poured from an inlet 11 into the cavity. A plurality of metal mold units are mounted on a forming machine. The molds are clamped with each other at high temperature and pressure, while the rubber is poured in the mold units. Thus, a plurality of sealing members 1 are molded at a time.

FIGS. 7 to 10 show the tubular sealing members of the second embodiment. A tubular sealing member 18 of the second embodiment has a head portion 4a having an open head.

The tubular sealing member 18 as shown in FIG. 7 has a plurality of annular grooves 7 circumferentially formed in an inner wall of a tubular body 20 of the sealing member 18. Similar to the first embodiment, the annular groove 7 is formed to have a curvature in section having a large radius R. Beside the annular grooves 7, an inner annular projecting rib 14 is provided adjacent the head of the body 20.

The sealing member 18 shown in FIG. 8 has a plurality of inner annular grooves 7a each of which has a sectional curvature having a small radius r, and the inner projecting rib 14.

The sealing member 18 of FIG. 9 has a plurality of annular projecting ribs 8 circumferentially formed on the inner wall of the tubular body 20.

The sealing member 18 shown in FIG. 10 has a plurality of annular projecting ribs 8a formed on the outer periphery of the tubular body 20. The inner projecting rib 14 is also provided in each of the sealing member 18 of FIGS. 9 and 10.

Figure 11:
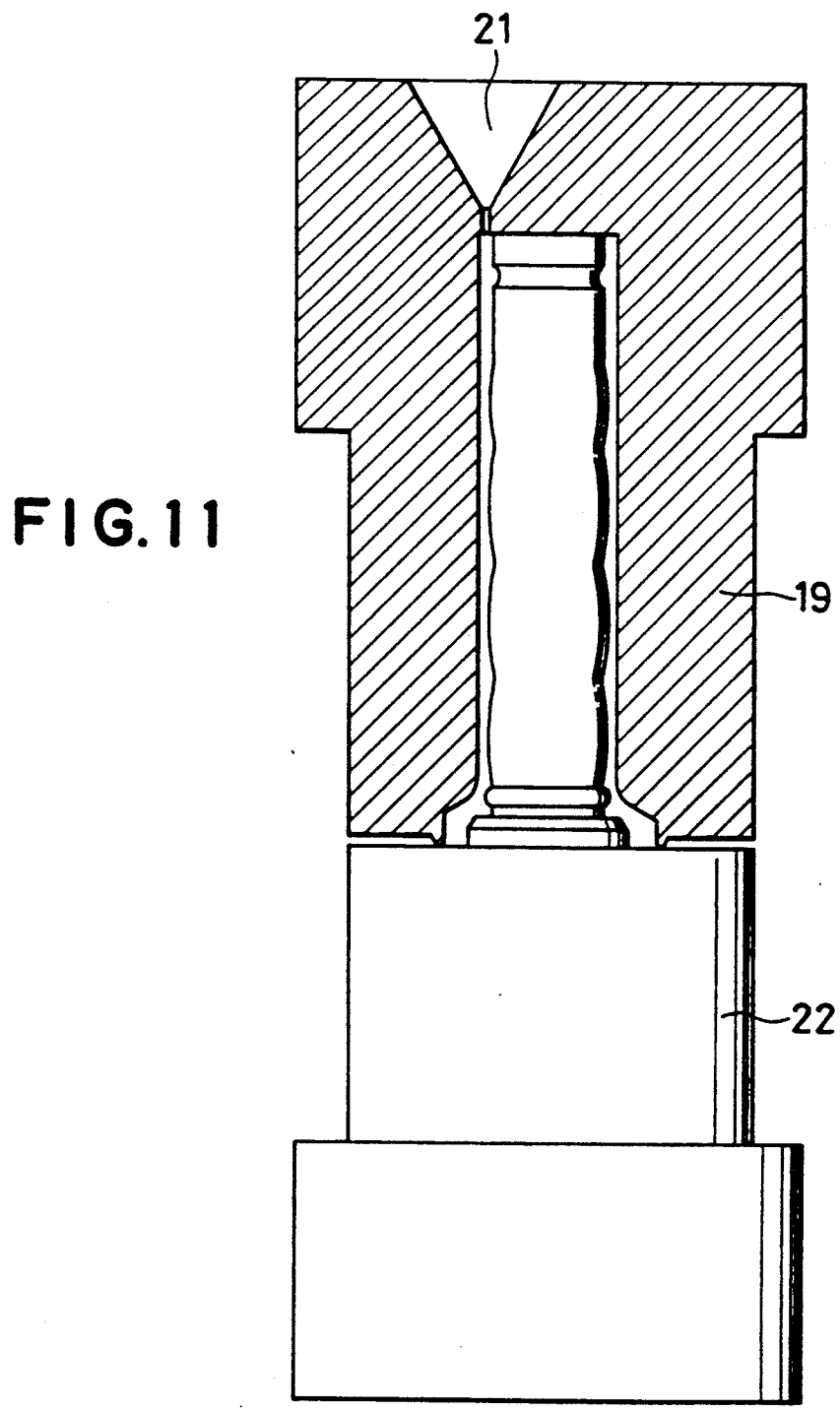
FIG. 11 is a sectional view of a metal molding unit for the sealing member of the second embodiment.

FIG. 11 shows a metal mold unit for molding the sealing member 18. A female mold 19 is mounted on a male mold 22, thereby forming a cavity there-between. Melted rubber is poured from an inlet 21 into the cavity.

Referring to FIGS. 12 and 13, a base portion 25 of the sealing member 18 is mounted in a seal pocket 13 of a cap 12 having a thread. The outer periphery of the seal pocket 13 is bent at a predetermined hydraulic pressure so that the sealing member 18 is secured to the threaded cap 12 with a sealing effect.

Figure 14:
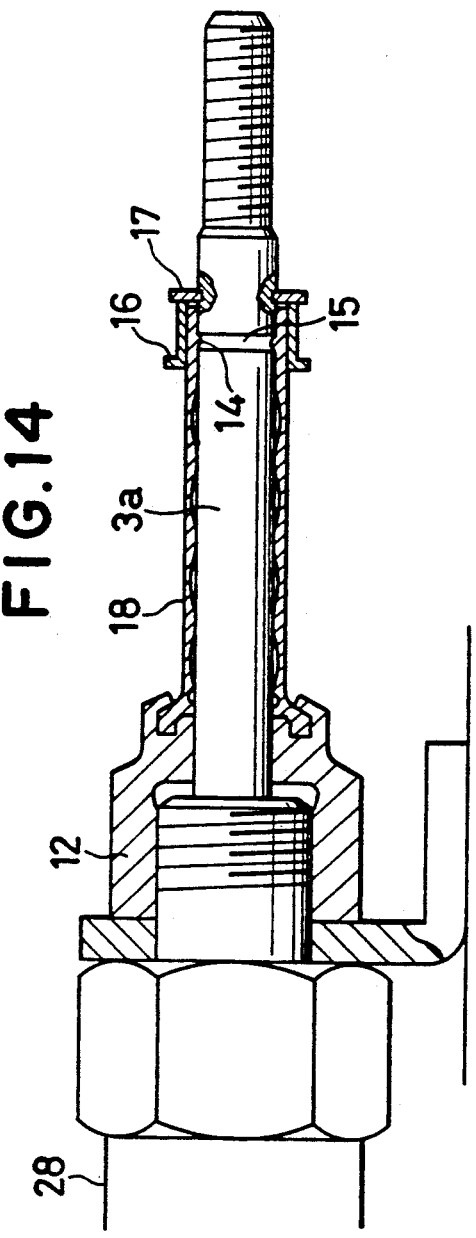
FIGS. 14 and 15 are sectional views of the sealing member mounted on an actuator.
Figure 15:
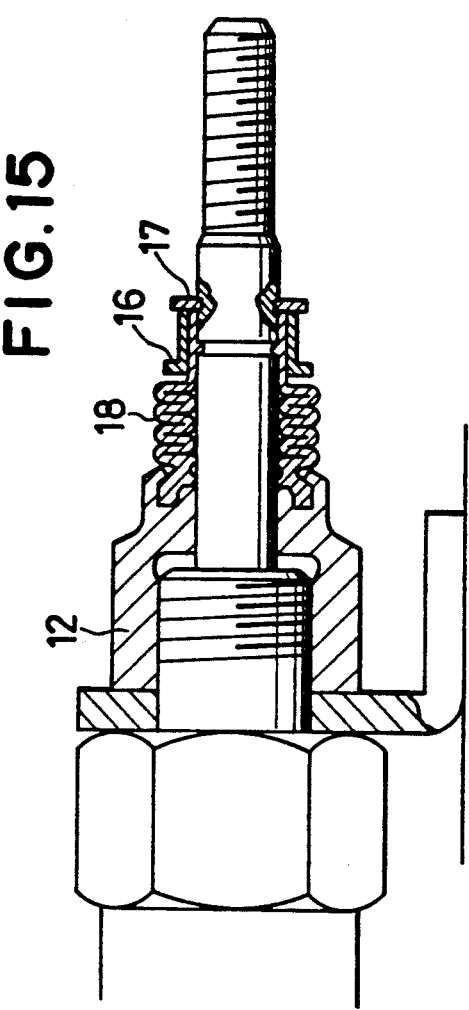

Referring to FIGS. 14 and 15, the threaded cap 12 is screwed with a screw of a hydraulic cylinder 28 as an actuator, while the sealing member 18 secured to the threaded cap 12 is mounted on a piston rod 3a of the actuator. The inner annular projecting rib 14 of the sealing member 18 is engaged with an annular groove 15 formed on the piston rod 3a. A retainer 16 is mounted on the tubular body 20 for preventing the sealing member 18 from removing and a snap ring 17 is secured to the retainer 16 to clamp the retainer to the piston rod 3a.

As shown in FIG. 15, when the piston rod 3a is inserted in the cylinder, the sealing member 18 is compressed into a bellows.

Since the sealing member is molded into a simple tubular body, it can be easily manufactured at a low cost. Because the sealing member is made of rubber, a high sealing effect is obtained. The tubular member is compressed from the straight tubular form to the bellows, so that a large stroke can be obtained with a member having a small length. Thus, the actuator using the tubular member can be small in size.

The applicant conducted the following durability experiment and had the good result.
Reciprocating stroke : 10 mm
Spring load : 11.5 kg
Cycle time : 6 seconds (On time : 3 seconds, Off time : 3 seconds)
Life : 310,000 cycles While the invention has been described in conjunction with preferred specific embodiments thereof, it will be understood that this description is intended to illustrate and not limit the scope of the invention, which is defined by the following claims.

What is claimed is:

1. A tubular member made of rubber for sealing a reciprocating rod comprising:

a tubular body having a right cylinder portion in a free form condition which is slidably engaged with the reciprocating rod, a base portion, a head portion, and a plurality of annular portions formed in the right cylinder portion and disposed in the axial direction thereof, the thickness of each annular portion being different from that of the right cylinder portion, so that a plurality of thin portions are formed in the right cylinder portion;

the base portion being arranged to be secured to a guide member of an actuator;

the head portion being arranged to be engaged with a reciprocating rod slidably supported in the guide member;

the annular portions being so designed that, when the rod is retracted in the guide member to contract the right cylinder portion, each of the thin portions is outwardly projected from the reciprocating rod to form a U-shaped section both sides of which are closely contacted with each other and that adjacent U-shaped portions are also closely contacted with each other.

2. The tubular member according to claim 1 wherein each of said annular portions is an annular groove formed in an inner wall of the tubular body.

3. The tubular member according to claim 1 wherein each of said annular portions is an annular projecting rib formed on an inner wall of the tubular body.

4. The tubular member according to claim 1 wherein each of said annular portions is an annular projecting rib formed on an outer periphery of the tubular body.

5. The tubular member according to claim 1 wherein said head portion has a closed head.

6. The tubular member according to claim 1 wherein said head portion has an open head.

7. The tubular member according to claim 1 wherein each of said thin portions is formed with an annular groove on an inner wall which has an arcuate section in longitudinal section of the right cylinder portion, and an annular projection having a V-shaped section is formed between adjacent annular grooves defining said annular portion.

* * * * *